: US010248367B2

(12) United States Patent
Fukushima

(10) Patent No.: US 10,248,367 B2
(45) Date of Patent: Apr. 2, 2019

(54) INFORMATION PROCESSING SYSTEM, INFORMATION PROCESSING APPARATUS, IMAGE FORMING APPARATUS, METHODS FOR CONTROLLING THE SAME, AND STORAGE MEDIUM

(71) Applicant: CANON KABUSHIKI KAISHA, Tokyo (JP)

(72) Inventor: Kenta Fukushima, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/690,327

(22) Filed: Aug. 30, 2017

(65) Prior Publication Data

US 2018/0067707 A1    Mar. 8, 2018

(30) Foreign Application Priority Data

Sep. 5, 2016    (JP) ................................ 2016-173126

(51) Int. Cl.
*G06F 3/12*      (2006.01)
*G06F 11/07*     (2006.01)
*H04L 29/06*     (2006.01)
*H04L 29/08*     (2006.01)

(52) U.S. Cl.
CPC ............ *G06F 3/1236* (2013.01); *G06F 3/121* (2013.01); *G06F 11/0733* (2013.01); *H04L 63/083* (2013.01); *H04L 63/0846* (2013.01); *G06F 3/1287* (2013.01); *H04L 67/02* (2013.01); *H04L 67/141* (2013.01)

(58) Field of Classification Search
CPC .. G06F 3/1236; G06F 3/1287; G06F 11/0733; H04L 63/083; H04L 63/0846; H04L 63/0838; H04L 63/067; H04L 63/068; H04L 67/02; H04L 67/141
See application file for complete search history.

(56) References Cited

U.S. PATENT DOCUMENTS

| 8,976,402 | B2  | 3/2015 | Nakamura |
|---|---|---|---|
| 2010/0014110 | A1* | 1/2010 | Munetomo .......... H04N 1/0084 358/1.14 |
| 2011/0128572 | A1* | 6/2011 | Hosotsubo .............. G06F 3/122 358/1.15 |

(Continued)

FOREIGN PATENT DOCUMENTS

JP    2015032224 A    2/2015

*Primary Examiner* — Moustapha Diaby
(74) *Attorney, Agent, or Firm* — Rossi, Kimms & McDowell LLP

(57) ABSTRACT

The present remote support system is provided as an information processing system including an image forming apparatus, an information processing apparatus, and a relay server. The present information processing apparatus obtains a first session ID and temporary authentication information for communicating with the image forming apparatus via the relay server by transmitting a request to the relay server, and the information processing apparatus displays the temporary authentication information on a display. Also, the present image forming apparatus accepts temporary authentication information via user input and uses the temporary authentication information to transmit a request to the relay server to obtain a second session ID for communicating with the information processing apparatus via the relay server.

15 Claims, 11 Drawing Sheets

(56) References Cited

U.S. PATENT DOCUMENTS

2014/0366101 A1* 12/2014 Murata .............. H04N 1/00127
　　　　　　　　　　　　　　　　　　　726/4
2016/0357976 A1* 12/2016 Suzuki ................... G06F 21/31

* cited by examiner

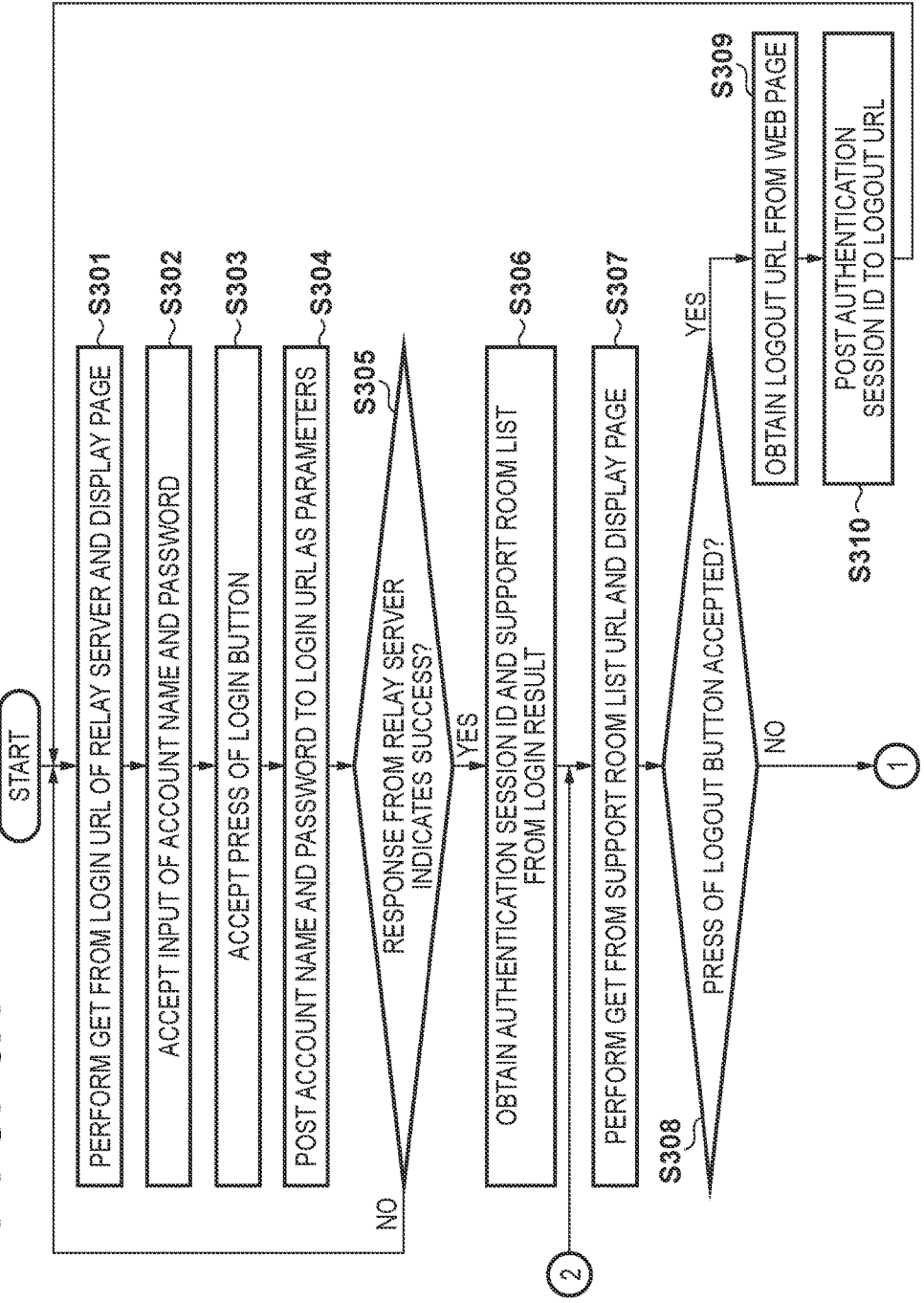

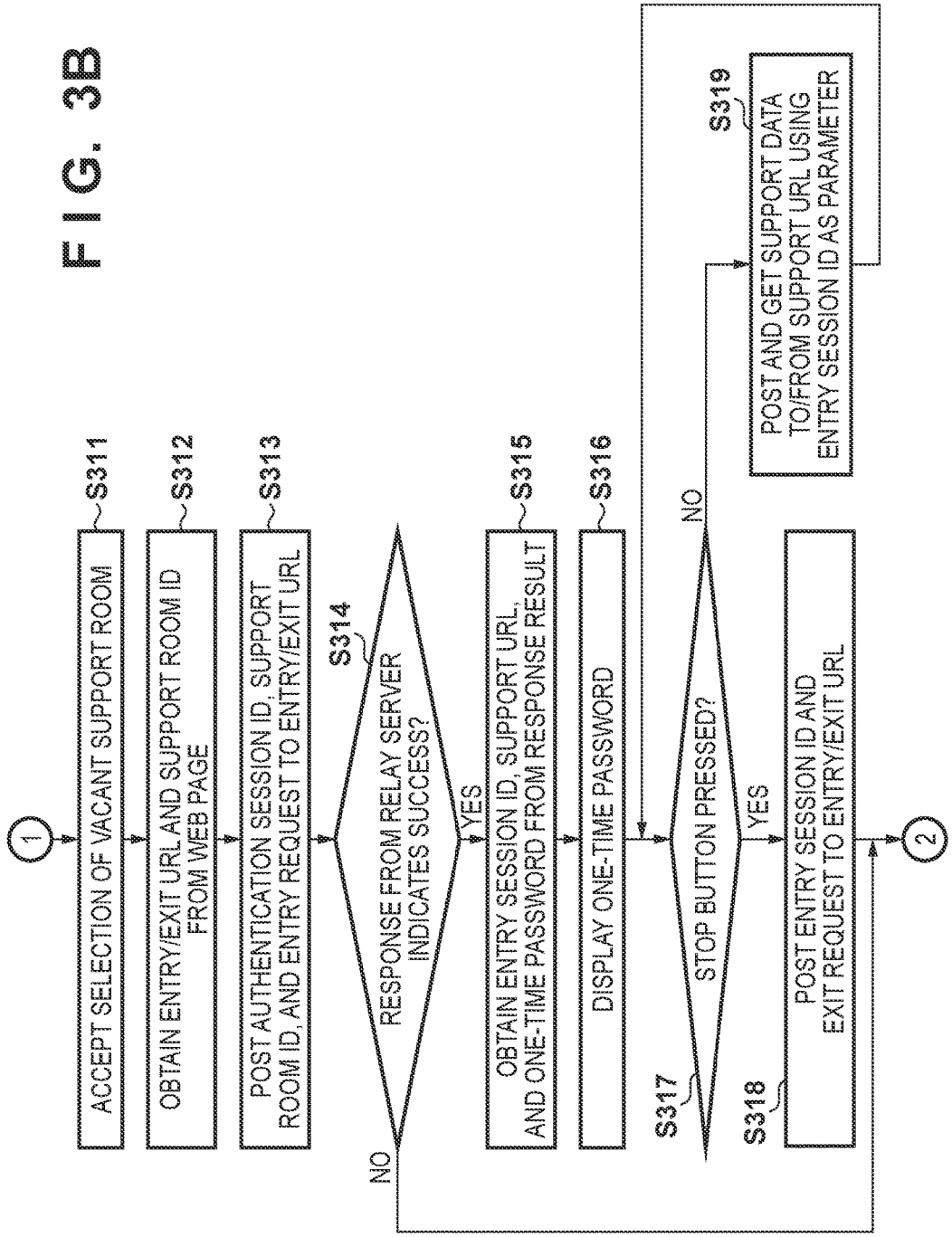

F I G. 6

SUPPORT ROOM LIST　　　　　　　　　　　　　　　　　　　　　600

| SUPPORT ROOM ID | PASSWORD | ENTRY SESSION ID | HOST USER |
| --- | --- | --- | --- |
| 100001 | | | |
| 100002 | 472876265 | awd9uajwa | User02 |
| 100003 | 872646223 | Ashoifnirbb pornvrgysn | User01 |
| 100004 | 566440983 | hoeghusnc | User05 |

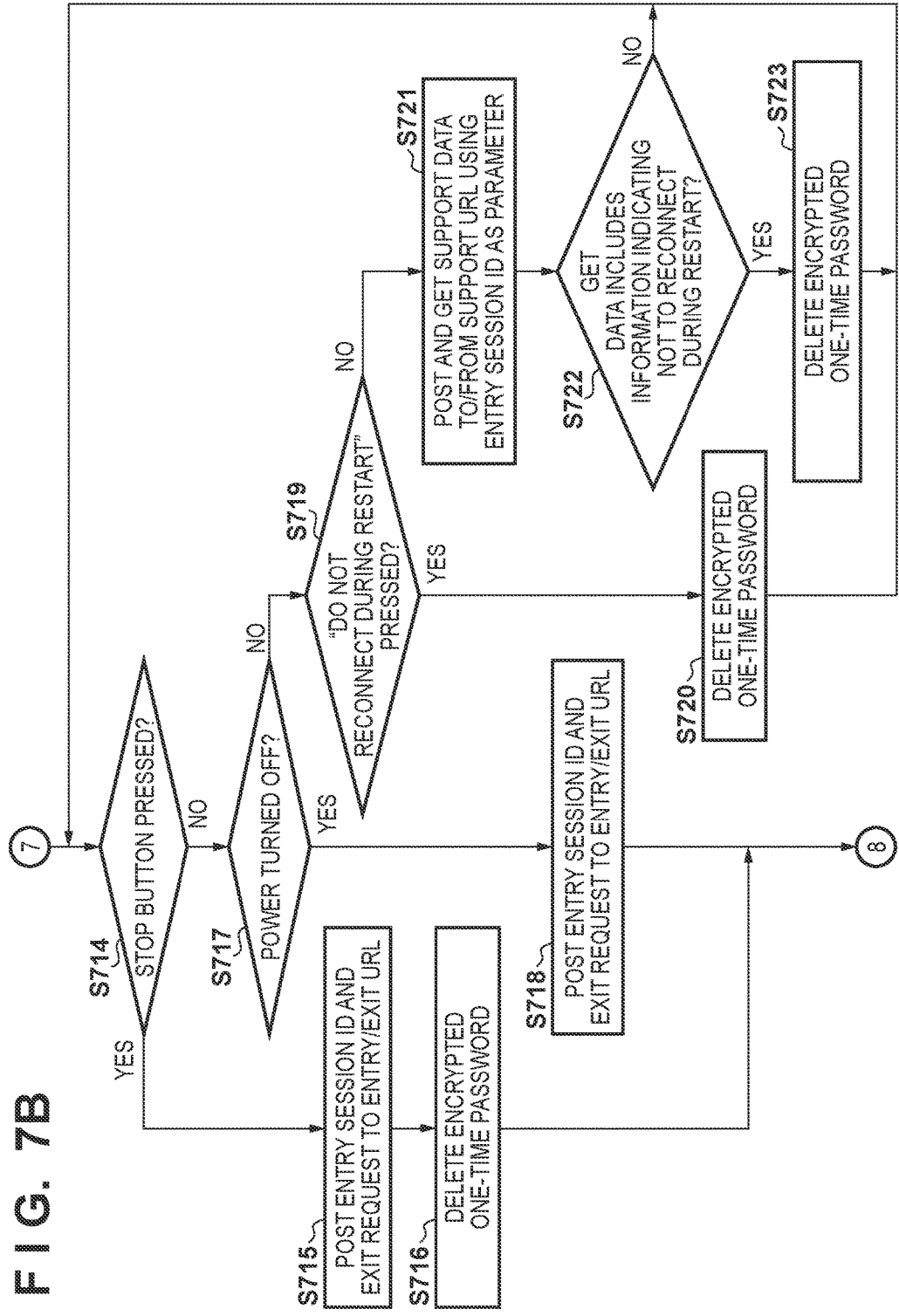

INFORMATION PROCESSING SYSTEM, INFORMATION PROCESSING APPARATUS, IMAGE FORMING APPARATUS, METHODS FOR CONTROLLING THE SAME, AND STORAGE MEDIUM

BACKGROUND OF THE INVENTION

Field of the Invention

The present invention relates to an information processing system that provides a remote support service, an information processing apparatus, an image forming apparatus, control methods for the same, and a storage medium.

Description of the Related Art

A remote support service obtained through audio or video communication or remote operation is currently being proposed for multi-function printers. With the remote support service, when an error occurs in the multi-function printer, a call center can solve the error by directly telling the user a method for solving the error, without a staff member for maintenance going to the actual site. Accordingly, it is possible to shorten the amount of time until the error is solved. With this kind of remote support service, it is efficient for the user to use a communication function of the multi-function printer to realize a connection with the call center, instead of using an apparatus other than the multi-function printer, such as a telephone or a PC.

However, in general, it is often difficult for the multi-function printer and the PC of the call center to directly establish a session due to a firewall introduced into the office. In view of this, a technique has been proposed in which HTTP, which is highly compatible with the firewall, is used to establish a session between information terminals. In general, connecting from the Internet to an information terminal blocked by a firewall is restricted. On the other hand, connecting to the Internet from an information terminal behind a firewall is generally permitted, as long as HTTP, which is highly compatible with the firewall, is used.

Japanese Patent Laid-Open No. 2015-32224 proposes that a session is established between two information terminals blocked by a firewall due to the information terminals connecting to a session management server that can connect them as HTTP clients. Also, in this kind of system, a session management server issues an inquiry code as an identifier for identifying and communicating that the multi-function printer is connected. The user of the multi-function printer tells the operator of the call center the inquiry code by telephone or the like, and the operator of the call center inputs the inquiry code into the system, whereby remote maintenance is started.

However, the following problem is present in the above-described conventional technique. The connection method of the above-described conventional technique is advantageous in that it is possible to easily connect from a multi-function printer. On the other hand, although being able to connect at any time using any multi-function printer through a user operation increases user-friendliness, the connection method of the conventional technique is disadvantageous from the viewpoint of the processing load of the server. Specifically, with the connection method of the above-described conventional technique, there is a possibility that an inquiry code that is to be issued when a multi-function printer performs connection will be issued randomly at a time when it is not needed, and there is a problem in that the load of the session management server will increase in order to process the inquiry code.

SUMMARY OF THE INVENTION

The present invention enables realization of a remote support service while reducing the processing load of a server.

One aspect of the present invention provides an information processing system that includes an image forming apparatus, an information processing apparatus, and a relay server, the information processing apparatus comprising: a memory device that stores a set of first instructions; a display unit; and at least one processor that executes the first instructions to: make a request to the relay server to obtain a first session ID for communicating with the image forming apparatus via the relay server and temporary authentication information, and display the obtained temporary authentication information on the display unit, the image forming apparatus comprising: a memory device that stores a set of second instructions; and at least one processor that executes the second instructions to: accept the temporary authentication information via user input, and make a request to the relay server using the accepted temporary authentication information to obtain access destination information corresponding to the temporary authentication information and a second session ID for communicating with the information processing apparatus via the relay server, and the relay server comprising: a memory device that stores a set of third instructions; and at least one processor that executes the third instructions to: issue the first session ID and the temporary authentication information in accordance with a request from the information processing apparatus, and issue the access destination information corresponding to the temporary authentication information accepted by the image forming apparatus and the second session ID, in accordance with a request from the image forming apparatus.

Another aspect of the present invention provides an information processing apparatus configured to perform communication with an image forming apparatus via a relay server, the information processing apparatus comprising: a memory device that stores a set of instructions; a display unit; and at least one processor that executes the instructions to: make a request to the relay server to obtain a first session ID and temporary authentication information for communicating with the image forming apparatus via the relay server, and display the obtained temporary authentication information on the display unit.

Still another aspect of the present invention provides an image forming apparatus configured to perform communication with an information processing apparatus via a relay server, the image forming apparatus comprising: a memory device that stores a set of second instructions; and at least one processor that executes the second instructions to: accept temporary authentication information issued from the relay server to the information processing apparatus via user input, and make a request to the relay server using the accepted temporary authentication information to obtain access destination information corresponding to the temporary authentication information and a second session ID for communicating with the information processing apparatus via the relay server.

Yet still another aspect of the present invention provides a method for controlling an information processing system that includes an image forming apparatus, an information processing apparatus, and a relay server, the method comprising: in the information processing apparatus, which includes a display unit, making a request to the relay server to obtain a first session ID and temporary authentication information for communicating with the image forming apparatus via the relay server; and displaying the obtained temporary authentication information on the display unit; in the image forming apparatus, accepting the temporary authentication information via user input; and making a request to the relay server using the accepted temporary authentication information to obtain access destination information corresponding to the temporary authentication information and a second session ID for communicating with the information processing apparatus via the relay server; and in the relay server, issuing the first session ID and the temporary authentication information in accordance with a request from the information processing apparatus, and issuing the access destination information corresponding to the temporary authentication information accepted by the image forming apparatus and the second session ID in accordance with a request from the image forming apparatus.

Still yet another aspect of the present invention provides a method for controlling an information processing apparatus that includes a display unit and is configured to communicate with an image forming apparatus via a relay server, the method comprising: making a request to the relay server to obtain a first session ID and temporary authentication information for communicating with the image forming apparatus via the relay server; and displaying the obtained temporary authentication information on the display unit.

Yet still another aspect of the present invention provides a method for controlling an image forming apparatus configured to perform communication with an information processing apparatus via a relay server, the method comprising: accepting temporary authentication information issued from the relay server to the information processing apparatus via user input; and making a request to the relay server using the accepted temporary authentication information to obtain access destination information corresponding to the temporary authentication information and a second session ID for communicating with the information processing apparatus via the relay server.

Still yet another aspect of the present invention provides a computer-readable storage medium storing a program for causing a computer to execute steps of a method for controlling an information processing apparatus that includes a display unit and is configured to communicate with an image forming apparatus via a relay server, the method comprising: making a request to the relay server to obtain a first session ID and temporary authentication information for communicating with the image forming apparatus via the relay server; and displaying the obtained temporary authentication information on the display unit.

Yet still another aspect of the present invention provides a computer-readable storage medium storing a program for causing a computer to execute steps of a method for controlling an image forming apparatus configured to perform communication with an information processing apparatus via a relay server, the method comprising: accepting temporary authentication information issued from the relay server to the information processing apparatus via user input; and making a request to the relay server using the accepted temporary authentication information to obtain access destination information corresponding to the temporary authentication information and a second session ID for communicating with the information processing apparatus via the relay server.

Further features of the present invention will be apparent from the following description of exemplary embodiments with reference to the attached drawings.

BRIEF DESCRIPTION OF THE DRAWINGS

FIGS. 3A and 3B are flowcharts showing processing performed by an operator PC according to an embodiment.

FIG. 6 is a diagram showing an example of a method for managing a support room list in a relay server according to an embodiment.

FIGS. 7A and 7B are flowcharts showing processing performed by an image processing apparatus according to an embodiment.

DESCRIPTION OF THE EMBODIMENTS

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

Network Configuration

Hereinafter, a first embodiment of the present invention will be described. First, a network configuration of a remote support (remote maintenance) system according to the present embodiment will be described with reference to FIG. 1. The present system is constituted by including an image forming apparatus 101, an operator PC 102, which is an information processing apparatus, and an HTTP relay server 103. The image forming apparatus 101 and the operator PC 102 are apparatuses to which the present invention is applied, and operate as mutual communication partners. The image forming apparatus 101 and the operator PC 102 include a data communication function of performing data communication by executing call control through HTTP (HyperText Transfer Protocol).

Figure 1:
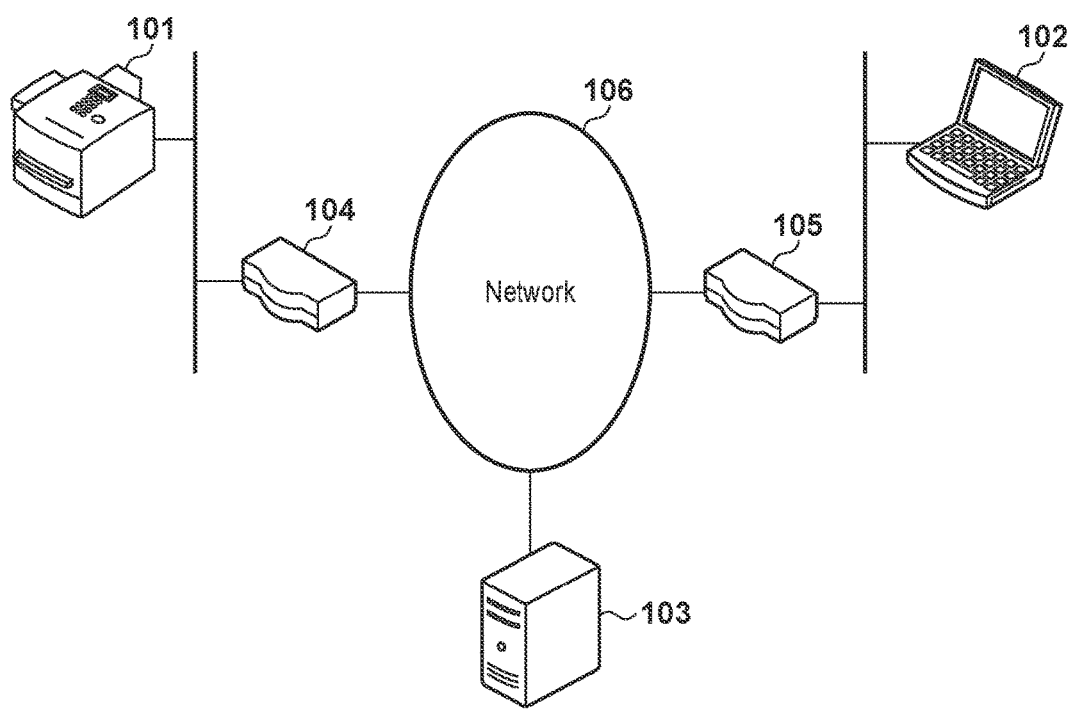
FIG. 1 is a diagram showing a network configuration according to an embodiment.

As shown in FIG. 1, the image forming apparatus 101 is connected to a network 106 through a firewall (FW) 104. Also, the operator PC 102 in a call center is connected to the network 106 through a FW 105. Additionally, the HTTP relay server 103 is connected to the network 106. In data communication through HTTP, client nodes perform data communication by performing POST/GET requests to a URI (Uniform Resource Identifier) provided from the HTTP relay server 103. Accordingly, the client nodes can perform data communication even if blocked by a private address area or a FW.

In the present embodiment, the image forming apparatus 101 and the operator PC 102 operate as HTTP client nodes. Also, in the present embodiment, although a configuration will be described in which the client nodes communicate with a network 106 via FWs, the present invention is not limited thereto, and it is also possible to apply a network configuration in which FWs are not used. Also, a larger number of FWs, image forming apparatuses, and operator PCs than shown in the drawings may be connected to the network 106. Also, in the present embodiment, HTTP need not be the communication protocol.

Hardware Configuration

Figure 2:
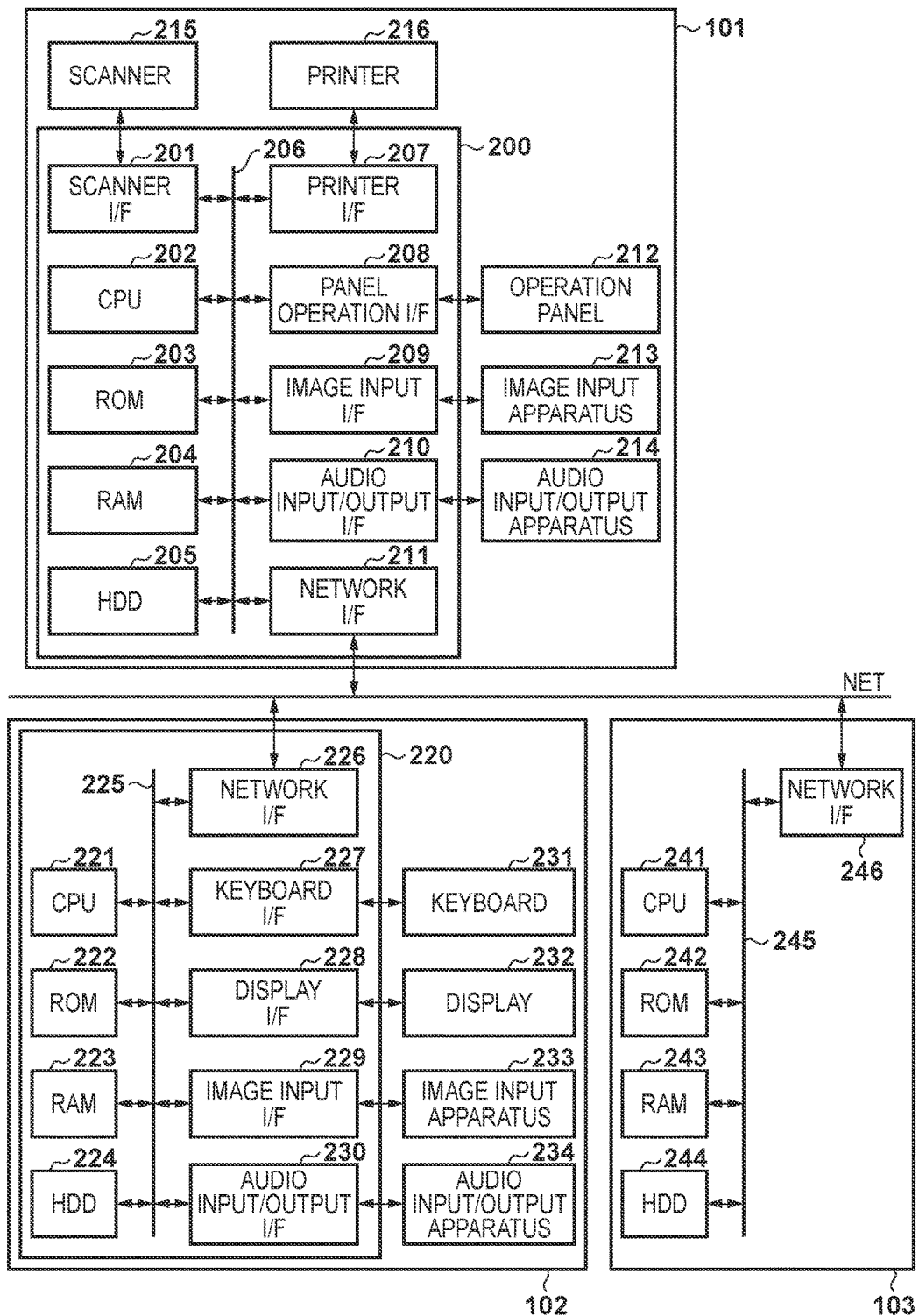
FIG. 2 is a diagram showing a hardware configuration of a remote support system according to an embodiment.

Next, a hardware configuration of a remote support system according to the present embodiment will be described with reference to FIG. 2. The image forming apparatus 101 includes a system control unit 200, an operation panel 212, an image input apparatus 213, an audio input/output apparatus 214, a scanner 215, and a printer 216. The system control unit 200 includes a scanner I/F 201, a CPU 202, a ROM 203, a RAM 204, an HDD 205, a printer I/F 207, a panel operation I/F 208, an image input I/F 209, an audio input/output I/F 210, and a network I/F 211. The devices can mutually transmit and receive data via a system bus 206.

The CPU 202 performs overall control of access of the various devices connected to the system bus 206 based on a control program stored in the ROM 203 or the hard disk (HDD) 205. The ROM 203 stores a control program and the like that can be executed by the CPU 202. The RAM 204 functions mainly as a main memory, work area, and the like of the CPU 202, and it is possible to expand the memory capacity using optional RAM connected to an extension port (not shown). The hard disk (HDD) 205 stores a boot program, various applications, font data, user files, editing files, and the like. Note that although the HDD 205 is used in the present embodiment, an SD card, a flash memory, or the like may be used as an external storage device in addition to the HDD 205.

The scanner I/F 201 controls image input from the scanner 215. The printer I/F 207 controls image output to the printer 216. The panel operation I/F 208 functions as an accepting unit and performs display control for the operation panel 212 and controls input of various types of setting information set by the operation panel 212. The image input I/F 209 controls image input from an image input apparatus 213 such as a camera. The audio input/output I/F 210 controls audio input/output to/from an audio input/output apparatus 214 such as a headset. The network I/F 211 performs data communication with an external network via a network cable.

The operator PC 102 includes a control unit 220, a keyboard 231, a display 232, an image input apparatus 233, and an audio input/output apparatus 234. The control unit 220 includes a CPU 221, a ROM 222, a RAM 223, an HDD 224, a network I/F 226, a keyboard I/F 227, a display I/F 228, an image input I/F 229, and an audio input/output I/F 230.

The CPU 221 performs overall control of access of the various devices connected to a system bus 225 based on a control program stored in the ROM 222 or the hard disk (HDD) 224. The ROM 222 stores a control program and the like that can be executed by the CPU 221. The RAM 223 functions mainly as a main memory, work area, and the like of the CPU 221, and it is possible to expand the memory capacity using optional RAM connected to an extension port (not shown). The hard disk (HDD) 224 stores a boot program, various applications, font data, user files, editing files, and the like. Note that although the HDD 224 was used in the present embodiment, an SD card, a flash memory, or the like may be used as an external storage device in addition to the HDD 224.

The network I/F 226 performs data communication with an external network via a network cable. The keyboard I/F 227 controls key input from a keyboard 231 or a pointing device (not shown). The display I/F 228 controls display on a display 232. The image input I/F 229 controls image input from an image input apparatus 233 such as a camera. The audio input/output I/F 230 controls audio input/output to/from an audio input/output apparatus 234 such as a headset.

The HTTP relay server 103 includes a CPU 241, a ROM 242, a RAM 243, an HDD 244, and a network I/F 246. The CPU 241 performs overall control of access of the various devices connected to a system bus 245 based on a control program stored in the ROM 242 or the hard disk (HDD) 244. The ROM 242 stores a control program and the like that can be executed by the CPU 241. The RAM 243 functions mainly as a main memory, work area, and the like of the CPU 241, and it is possible to expand the memory capacity using optional RAM connected to an extension port (not shown). The hard disk (HDD) 244 stores a boot program, various applications, font data, user files, editing files, and the like. Note that although the HDD 244 was used in the present embodiment, an SD card, a flash memory, or the like may be used as an external storage device in addition to the HDD 244. The network I/F 246 performs data communication with an external network via a network cable.

Processing Procedure

Hereinafter, a flow of overall operations in a remote support system according to the present embodiment will be described with reference to FIGS. 3A to 5C. First, the operator PC 102 accesses the HTTP relay server 103 and enters a state of waiting for the start of remote maintenance. Next, the image forming apparatus 101 accesses the HTTP relay server 103 and remote maintenance is started. In the subsequent section and onward, more detailed processing performed by the image forming apparatus 101, the operator PC 102, and the HTTP relay server 103 will be described.

Processing Procedure of Operator PC

First, a processing procedure of the present embodiment performed by the operator PC 102 will be described with reference to FIGS. 3A and 3B. The processing described below is realized by a program stored in the HDD 224 being read out to the RAM 223 and executed by the CPU 221 for example. Note that GET/POST (requests) described below are methods for requesting Web pages from the HTTP relay server 103. The transmission content for GET is transmitted as a URL, there is a limit to the amount of information that can be transmitted, and GET has low confidentiality. On the other hand, since the transmission content for POST is defined in the body portion, POST has a more complicated procedure in comparison to a GET request, but a larger amount of data can be transmitted and confidentiality is also higher.

First, in step S301, the CPU 221 of the operator PC 102 performs GET so as to obtain a login URL of the HTTP relay server 103, and displays a Web page on the display 232. The screen display of the operator PC 102 is performed via a Web browser. The login URL may be input directly to the Web browser, or may be accessed through a bookmark or the like.

Next, in step S302, the CPU 221 accepts input of an account name and a password as authentication information on the Web page displayed in step S301. Next, in step S303, the CPU 221 accepts a press of a login button on the Web page displayed in step S301. Upon accepting the press of the login button in step S303, in step S304, the CPU 221 performs POST of the account name and password to the login URL (HTTP relay server 103). The HTTP relay server 103 performs a response to the POST, and in step S305, the CPU 221 determines whether the response indicates success or failure. If it indicates success, the processing moves to step S306, and if it indicates failure, the processing returns to step S301.

In step S306, the CPU 221 obtains an authentication session ID and a support room list URL from the response result. Here, the support room (access destination) is for supporting an image forming apparatus defined by the HTTP relay server 103 in a virtual space, the operator PC and the image forming apparatus are connected via a support room of the relay server, and remote support (remote maintenance) is carried out for the image forming apparatus. The authentication session ID is a random character string indicating that authentication was successful according to the account name and password. Next, in step S307, the CPU 221 performs GET to the support room list URL with the authentication session ID designated as a parameter and displays a Web page on the display 232. The Web page that can be obtained from the support room list URL is a page by which an operator references a list of multiple support rooms for supporting image forming apparatuses, which exist in the HTTP relay server 103. The Web page displays support room IDs for each support room and information indicating usage situations of support rooms (access destinations), namely, whether or not they are vacant. The support room IDs are IDs that indicate virtual spaces in the HTTP relay server 103 for the image forming apparatus 101 to receive remote maintenance.

After the Web page displayed in step S307 is displayed, in step S308, the CPU 221 determines whether or not a press of the logout button was accepted. If it is determined in step S308 that the press of the logout button was accepted, the processing moves to step S309, and the CPU 221 obtains a logout URL from the Web page displayed in step S307. Next, in step S310, the CPU 221 performs POST of the authentication session ID to the logout URL obtained in step S309 and returns the processing to step S301.

On the other hand, if the press of the logout button was not accepted in step S308, in step S311, the CPU 221 accepts selection of a vacant support room. Upon accepting the selection, in step S312, the CPU 221 obtains an entry/exit URL and a support room ID from the Web page. Next, in step S313, the CPU 221 performs POST of the authentication session ID, the support room ID, and an entry request of the operator PC 102 to the entry/exit URL. Here, the entry request is a request to access the entry/exit URL. The HTTP relay server 103 performs a response to the POST, and in step S314, the CPU 221 determines whether the response indicates success or failure. If it is determined in step S314 that the response indicates failure, the processing returns to step S307. If it is determined in step S314 that the response indicates success, the processing moves to step S315, and the CPU 221 obtains the entry session ID, support URL, and one-time password from the response result. The information of the response result is entirely created by the HTTP relay server 103. The entry session ID is a random character string indicating that entry into a support room of the HTTP relay server 103 was successful. The one-time password is temporary authentication information, is a character string, a numeral string, or a combination thereof provided temporarily to the support room entered by the operator PC 102, and in the HTTP relay server 103, it is possible to specify the support room ID. The one-time password is also temporary authentication information for the HTTP relay server 103.

Next, in step S316, the CPU 221 displays the one-time password obtained in step S315 on the display 232. The operator of the operator PC 102 reads the one-time password and tells the user of the image forming apparatus 101 the one-time password using a means such as a telephone or e-mail. Accordingly, when authentication to the HTTP relay server 103 is performed from the image forming apparatus 101, the image forming apparatus 101 and the operator PC 102 simultaneously enter the same support room of the HTTP relay server 103, and remote maintenance is possible.

When the processing of step S316 is performed, in step S317, the CPU 221 determines whether or not the stop button has been pressed. If the stop button has not been pressed, the processing moves to step S319, and the CPU 221 performs POST and GET of the support data to the support URL using the entry session ID as a parameter. Examples of support data include VNC (Virtual Network Computing) protocol data, video data, audio data, and data for conveying the state of trouble in the image forming apparatus. By performing POST/GET, the image forming apparatus 101 receives the remote maintenance service from the operator PC 102. The processing of step S319 is carried out repeatedly until the result of the determination in step S317 is YES. If it is determined in step S317 that the stop button was pressed, the processing moves to step S318, the CPU 221 performs POST of the entry session ID and an exit request to the entry/exit URL, and the processing is returned to step S307. Here, the exit request is a request to end access to the entry/exit URL.

Processing Procedure of Image Forming Apparatus

Figure 4:
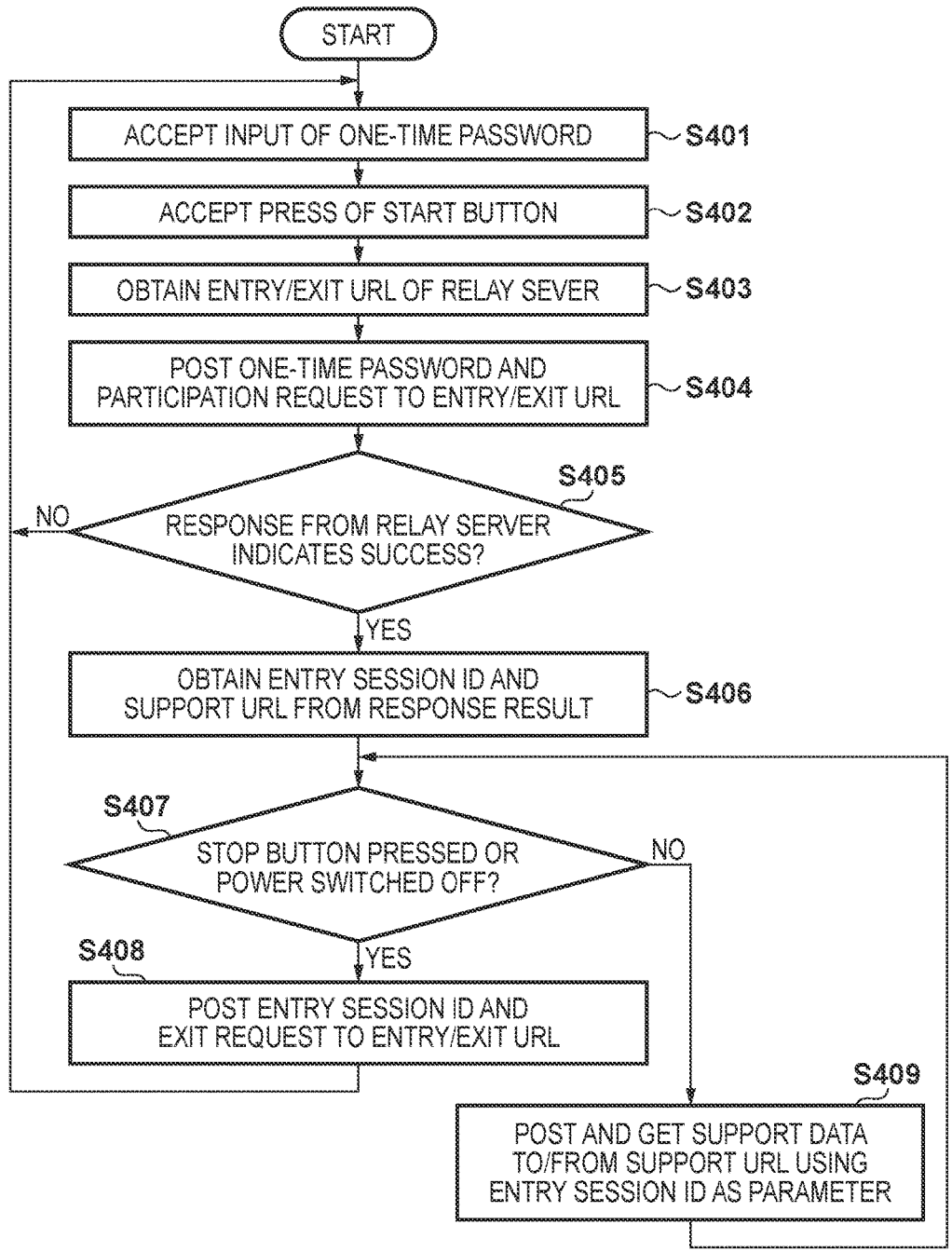
FIG. 4 is a flowchart showing processing performed by an image processing apparatus according to an embodiment.

Next, a processing procedure of the image forming apparatus 101 according to the present embodiment will be described with reference to FIG. 4. The processing described below is realized by a program stored in the HDD 205 being read out to the RAM 204 and executed by the CPU 202 for example.

First, in step S401, the CPU 202 of the image forming apparatus 101 accepts input of a one-time password performed by the user via the operation panel 212 on a screen (acceptance screen) for remote maintenance. As was described with reference to the flowchart shown in FIGS. 3A and 3B, the one-time password is told to the user of the image forming apparatus 101 by the operator of the operator PC 102 through a means such as telephone or e-mail. When the one-time password is input, in step S402, the CPU 202 accepts a press of the start button. When the start button is pressed, in step S403, the CPU 202 obtains the entry/exit URL of the HTTP relay server 103. The entry/exit URL may be registered in advance in the image forming apparatus 101 or may be obtained from an external information processing apparatus. Examples of the external information processing apparatus include the only management server in the entire world that collects trouble information of the image forming apparatus.

Next, in step S404, the CPU 202 performs POST of the one-time password and a participation request to the entry/exit URL. The relay server 103 performs a response to the POST, and in step S405, the CPU 202 determines whether the response indicates success or failure. If it indicates success, the processing moves to step S406, and if it does not indicate success, the processing returns to step S401.

If success is indicated in step S405, in step S406, the CPU 202 obtains the entry session ID and the support URL from the response result. Next, in step S407, the CPU 202 determines whether or not the stop button was pressed or the power was turned off. If the result of step S407 is YES, the processing moves to step S408, the CPU 202 performs POST of the entry session ID and an exit request to the entry/exit URL and the processing returns to step S401.

On the other hand, if the result of step S407 is NO, the processing moves to step S409, the CPU 202 performs POST and GET of the support data to/from the support URL using the entry session ID as a parameter. The support data is as described with reference to FIGS. 3A and 3B. The processing of step S409 is carried out repeatedly until the result of the determination in step S407 is YES.

Processing Procedure of Information Processing Apparatus

Figure 5A:
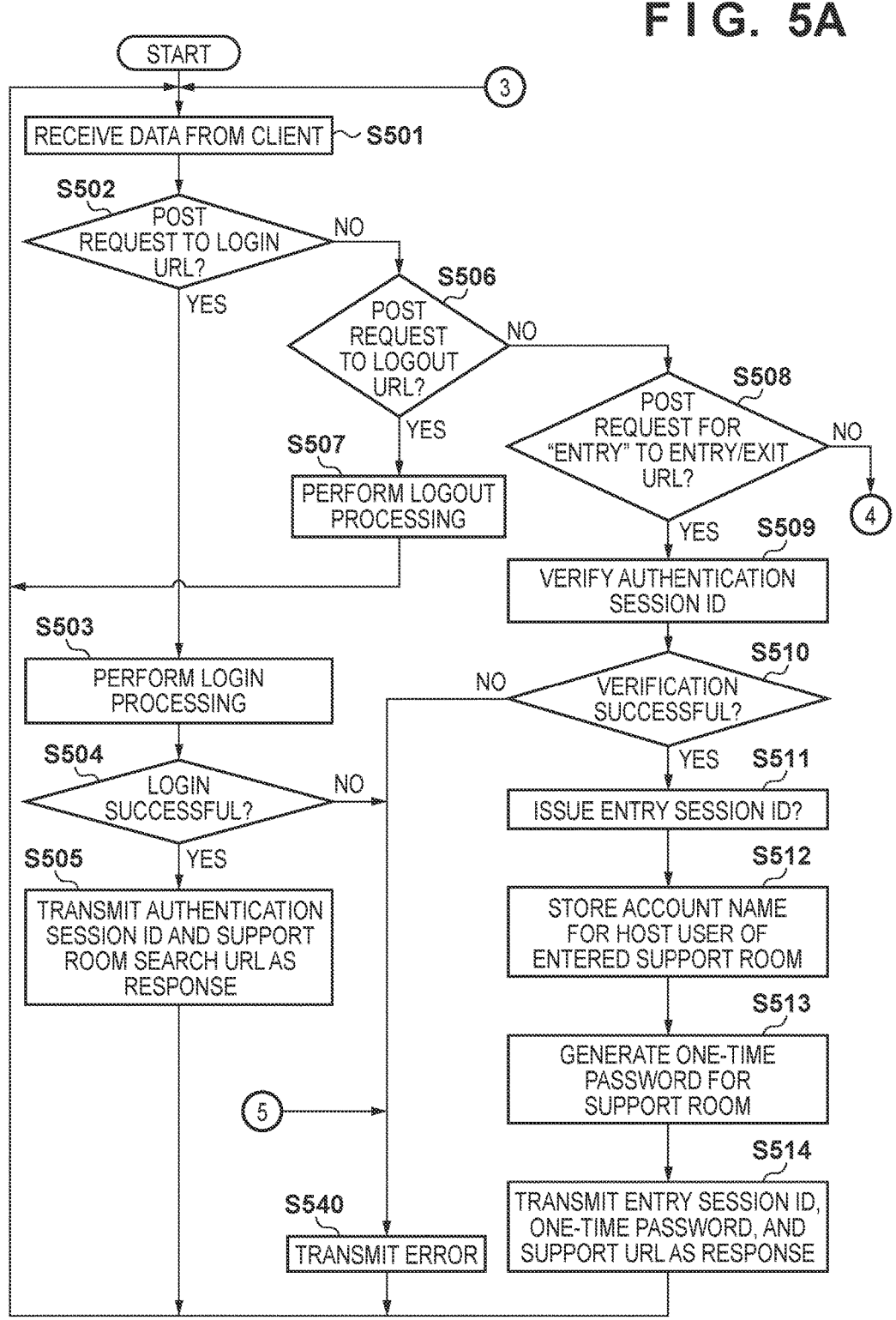
FIGS. 5A-5C are flowcharts showing processing performed by a relay server according to an embodiment.
Figure 5B:
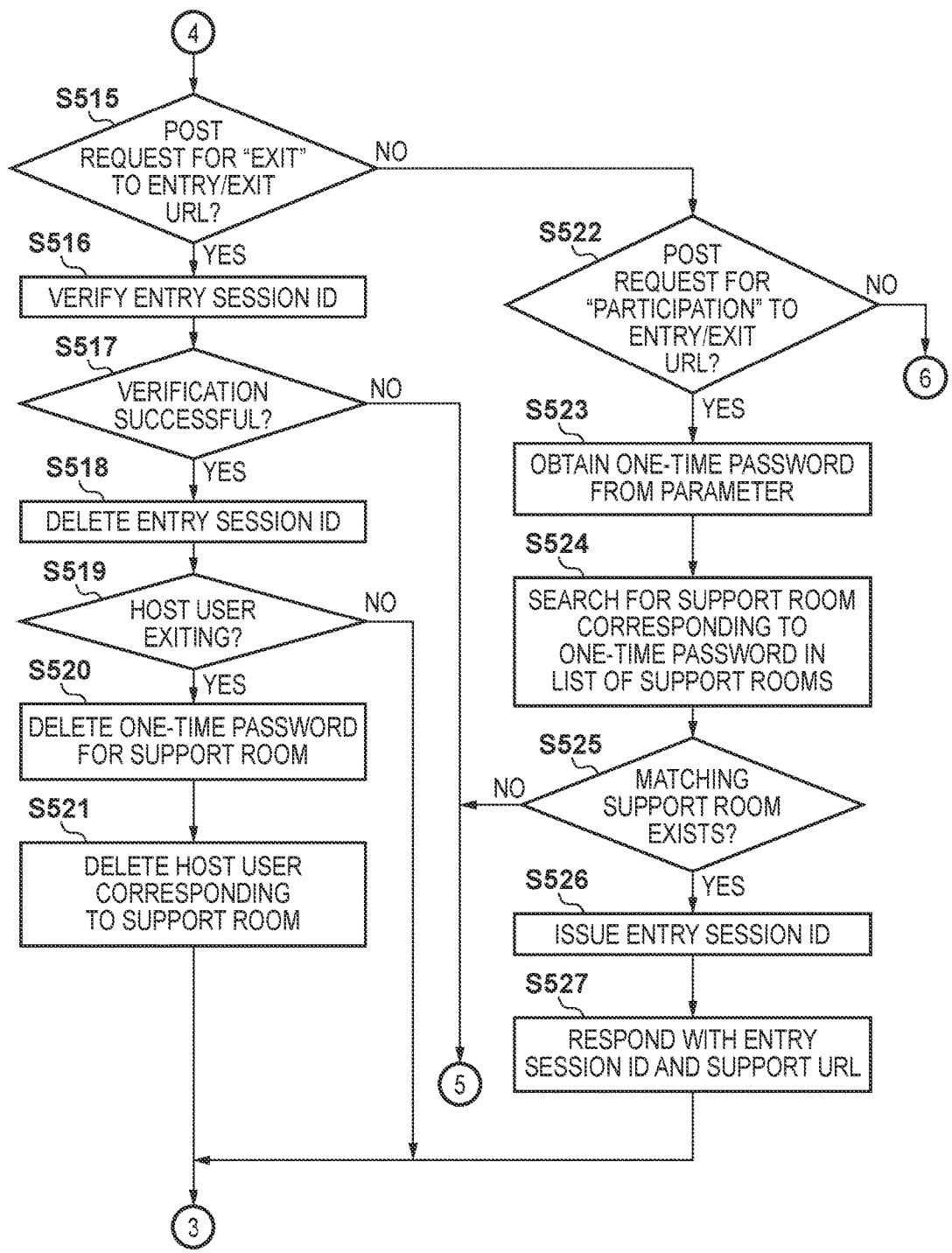
Figure 5C:
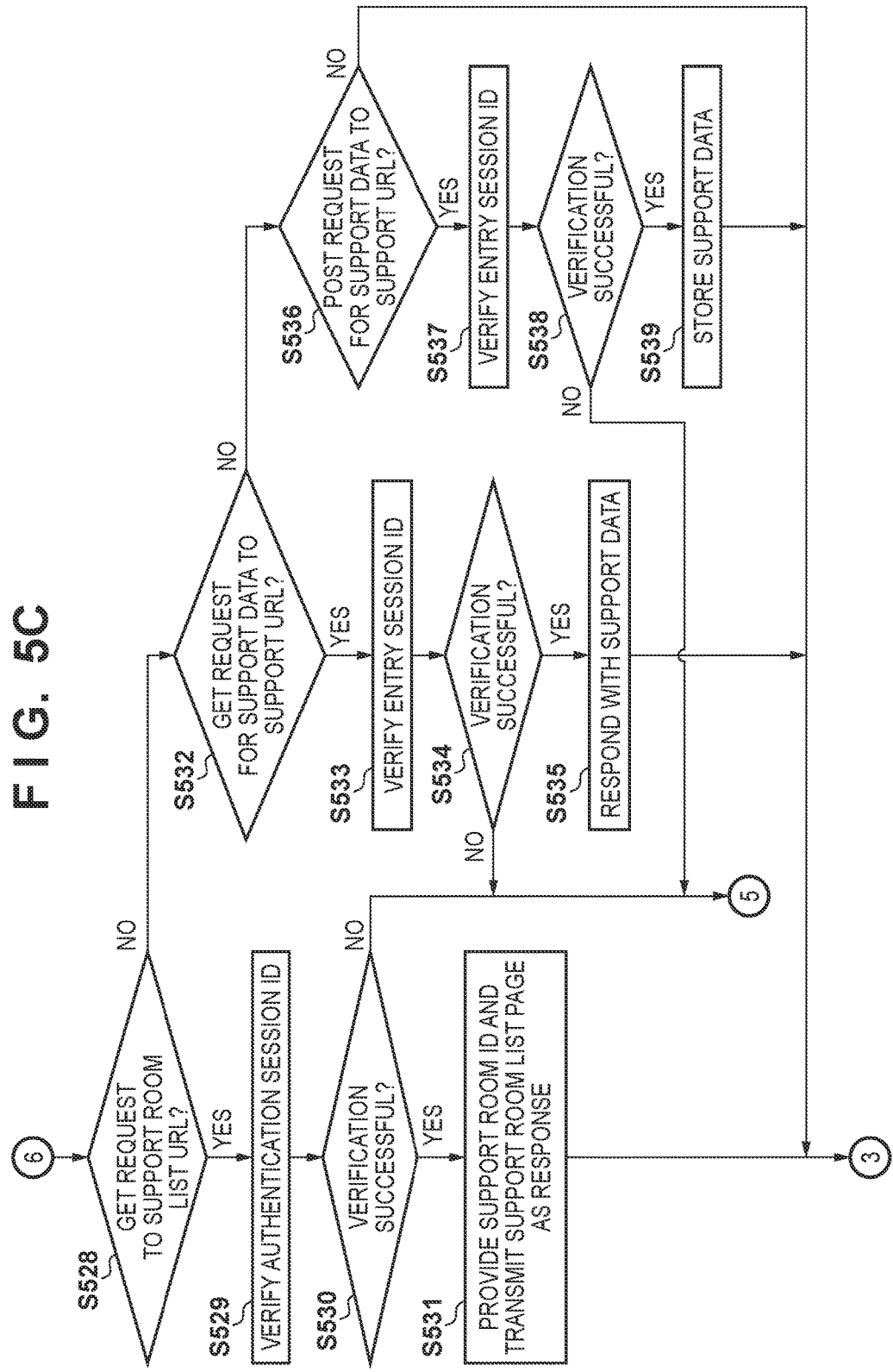

Next, a processing procedure of the HTTP relay server 103 according to the present embodiment will be described with reference to FIGS. 5A-5C. The processing described below is realized by a program stored in the HDD 244 being read out to the RAM 243 and executed by the CPU 241 for example.

First, in step S501, the CPU 241 of the HTTP relay server 103 receives data from a client. The client in this context is the image forming apparatus 101 or the operator PC 102. Upon receiving the data, the HTTP relay server 103 determines what kind of request the received data is (steps S502, S506, S508, S515, S522, S528, S532, and S536). If it is an undeterminable request (No in step S536), the processing returns to step S501 and the next piece of data is received.

In step S502, the CPU 241 determines whether or not the data received in step S501 is a POST request to a login URL. If it is, the processing moves to step S503, and if it is not, the processing moves to step S506. In step S503, the CPU 241 performs login processing. In login processing, general authentication processing, such as verifying a password and verifying a certificate token, is performed. Detailed description of the authentication processing is not included here. In the login processing, a random character string, which is an authentication session ID for the account, is ultimately issued. Knowing the authentication session ID is proof of being the authenticated client. Next, in step S504, the CPU 241 determines whether or not verification of the password and the like was successful in the login processing. If login was not successful, the processing moves to step S540, the CPU 241 transmits an error as a response to the client, and the processing returns to step S501. On the other hand, if the login was successful, the processing moves to step S505, the CPU 241 transmits the authentication session ID and a support room search URL that was set in advance in the HTTP relay server 103 as a response to the client, and the processing returns to step S501.

In step S506, the CPU 241 determines whether or not the data received in step S501 is a POST request to a logout URL. If it is, the processing moves to step S507, and if it is not, the processing moves to step S508. In step S507, the CPU 241 performs logout processing, and the processing returns to step S501. Specifically, the CPU 241 discards the authentication session ID for which POST was performed.

In step S508, the CPU 241 determines whether or not the data received in step S501 is a POST request for entry to an entry/exit URL. If it is, the processing moves to step S509, and if it is not, the processing moves to step S515. In step S509, the CPU 241 verifies the authentication session ID for which POST was performed. Specifically, the CPU 241 verifies whether or not the received data is the authentication session ID that was correctly issued in the login processing of step S503. Thereafter, in step S510, the CPU 241 determines whether or not the verification result is successful. If it is not successful, the processing moves to step S540, and the CPU 241 transmits an error as a response to the client. On the other hand, if the verification is successful, the processing moves to step S511 and the CPU 241 issues the entry session ID. The entry session ID is added to an entry session ID column in a row of a support room list corresponding to the support room ID included in the POST request. Here, an example of a support room list held by the HTTP relay server 103 will be described with reference to FIG. 6. In a support room list 600, a password, an entry session ID, and information of a host user (user information) can be registered in association with each other for each support room ID. It is indicated that the support room ID "100001" shown in FIG. 6 is a vacant room, since no password, entry session ID, or information of a host user has been registered. It is indicated that the support room IDs "100002" and "100003" are in use since all of the information has been registered therein. Although all of the information has been registered in the support room ID "100004", an entry session ID that does not belong to the host user is registered therein. That is, the host user "User05" and the entry session ID "hoeghusnc" have not been associated with each other.

The description will now return to FIG. 5A. Next, in step S512, the CPU 241 adds the account name (information of the host user) of the POST request source to the host user column in the row of the entered support room ID in the support room list. The account name can be searched for using the information on the authentication session ID in the POST request. Also, the entry session ID added in step S511 and the account name added in step S512 are registered in association with each other in the support room list, and the entry session IDs and the account names associated with each other are held. Next, in step S513, the CPU 241 generates a one-time password for the support room. The one-time password is a randomly-generated character string, numeral string, or combination thereof. The example of the support room list in the case where steps S511, S512, and S513 were performed is like the row for support room ID "100002" in FIG. 6. Thereafter, in step S514, the CPU 241 transmits the entry session ID, the one-time password, and the support URL set in advance in the HTTP relay server 103 as a response to the operator PC 102, which is a client, and the processing returns to step S501.

In step S515, the CPU 241 determines whether or not the data received in step S501 is a POST request for exiting to an entry/exit URL. If it is, the processing moves to step S516, and if it is not, the processing moves to step S522. In step S516, the CPU 241 verifies the entry session ID. Specifically, the CPU 241 verifies whether or not the corresponding entry session ID exists in the support room list. Thereafter, in step S517, the CPU 241 determines whether or not the verification result was successful, and if not, the processing moves to step S540, the CPU 241 transmits an error as a response to the client, and the processing returns to step S501. On the other hand, if the verification is successful, the processing moves to step S518 and the CPU 241 deletes the entry session ID. Specifically, the CPU 241 searches in the support room list for the entry session ID in the POST request and deletes it. The example of the support room list in the case where only the image forming apparatus 101 exits when the image forming apparatus 101 and the operator PC 102 are in the support room is like the row for support room ID 100004 in FIG. 6. With the support room ID "100004", a transition is made from a state in which two entry session IDs are registered, as with the support room ID "100003", to a state in which one of the entry session IDs is deleted, for example.

Next, in step S519, the CPU 241 determines whether or not the deleted entry session ID corresponds to the host user. Determination is possible since the entry session ID and the host user are associated as described in step S512. If it is not the host user in step S519, the processing returns to step S501. If it is the host user in step S519, the processing moves to step S520 and the CPU 241 deletes the one-time password in the row for the corresponding support room. Furthermore, in step S521, the CPU 241 deletes the host user and the entry session ID in the row for the corresponding support room and the processing returns to step S501. Here, the deletion of the entry session ID is performed as long as an entry session ID other than the entry session ID deleted in step S518 has been registered. Accordingly, even if an entry session ID other than that of the host user remains, it is deleted without fail, and the room becomes vacant again. Accordingly, the example of the support room ID "100001" shown in FIG. 6, which indicates that the support room has entered the vacant state, is an example of a support room list after steps S520 and S521 are carried out.

In step S522, the CPU 241 determines whether or not the data received in step S501 is a POST request for a participation request to the entry/exit URL. If it is, the processing moves to step S523, and if it is not, the processing moves to step S528. In step S523, the CPU 241 obtains the one-time password from the parameter and searches for the one-time password in the support room list in step S524. Next, in step S525, the CPU 241 determines whether or not a matching support room exists in the search for the one-time password. If no matching support room exists, the processing moves to step S540, the CPU 241 transmits an error as a response to the client, and the processing returns to step S501. On the other hand, if a matching support room exists, the processing moves to step S526 and the CPU 241 issues the entry session ID. The entry session ID is added to the entry session ID column in the row corresponding to the matching support room. An example of a support room list in the case where step S526 is performed is like the row of support room ID "100003" shown in FIG. 6, and multiple values are stored as the entry session ID. The processing of step S526 cannot be carried out unless the entry processing of step S513 has been performed in advance, and therefore control is performed such that the image forming apparatus 101 successfully participates only after the operator PC 102 has successfully entered the room in the HTTP relay server 103. Due to this control, the image forming apparatus 101 is prevented from entering the room before the operator PC 102. Furthermore, in step S527, the CPU 241 transmits the entry session ID and the support URL set in advance in the HTTP relay server 103 as a response to the client, and the processing returns to step S501.

In step S528, the CPU 241 determines whether or not the data received in step S501 is a GET request to a support room list URL. If it is, the processing moves to step S529, and if it is not, the processing moves to step S532. In step S529, the CPU 241 verifies the authentication session ID for which POST was performed. Specifically, the CPU 241 verifies whether or not the received data is the authentication session ID that was correctly issued in the login processing of step S503. Thereafter, in step S530, the CPU 241 determines whether or not the verification result was successful, and if not, the processing moves to step S540, the CPU 241 transmits an error as a response to the client, and the processing returns to step S501. On the other hand, if the verification is successful, the processing moves to step S531, the CPU 241 provides a Web page of the support room list to the client, and the processing returns to step S501. The Web page includes a list of support room IDs, information about whether or not each support room is vacant, entry/exit URLs, and a logout URL.

In step S532, the CPU 241 determines whether or not the data received in step S501 is a GET request to a support URL. If it is, the processing moves to step S533, and if it is not, the processing moves to step S536. In step S533, the CPU 241 verifies the entry session ID. Specifically, the CPU 241 verifies whether or not the corresponding entry session ID exists in the support room list. Thereafter, in step S534, the CPU 241 determines whether or not the verification result was successful, and if not, the processing moves to step S540, the CPU 241 transmits an error as a response to the client, and the processing returns to step S501. On the other hand, if the verification is successful, the processing moves to step S535, the CPU 241 obtains data from a data buffer joined to the support room and transmits it as a response to the client, and the processing returns to step S501.

In step S536, the CPU 241 determines whether or not the data received in step S501 is a POST request to a support URL. If it is, the processing moves to step S537, and if it is not, the processing returns to step S501. In step S537, the CPU 241 carries out verification of the entry session ID and determines in step S538 whether or not verification was successful. If the verification is not successful, the processing moves to step S540, the CPU 241 transmits an error as a response to the client, and the processing returns to step S501. On the other hand, if the verification is successful, the processing moves to step S539, the CPU 241 stores the data in a data buffer joined to the support room, and the processing returns to step S501. Remote maintenance is realized through the processing of steps S532 to S539.

As described above, the remote support system according to the present embodiment is provided as an information processing system that includes an image forming apparatus, an information processing apparatus, and a relay server. The present information processing apparatus obtains a first session ID and temporary authentication information for communicating with the image forming apparatus via the relay server by transmitting a request to the relay server, and the information processing apparatus displays the temporary authentication information on a display. Also, the present image forming apparatus accepts temporary authentication information via user input and uses the temporary authentication information to transmit a request to the relay server to obtain corresponding access destination information and a second session ID for communicating with the information processing apparatus via the relay server. Also, the relay server issues the first session ID and the temporary authentication information in accordance with a request from the information processing apparatus and issues the access destination information and the second session ID corresponding to the temporary authentication information accepted by the image forming apparatus, in accordance with a request from the image forming apparatus. Accordingly, it is possible for only the operator PC 102 to enter the support room in advance. Accordingly, control can be performed such that the user of the image forming apparatus 101 cannot participate in the support room unless the one-time password has been obtained from the operator of the operator PC 102. Accordingly, the multi-function printer can only connect after the PC of the operator has connected to the session management server, whereby it is possible to reduce the load of the session management server.

Second Embodiment

Hereinafter, a second embodiment of the present invention will be described. In the present embodiment, control in the case of restarting an image forming apparatus that is being provided with the remote support service will be described. In the present embodiment, the network configuration and the hardware configuration are the same as those of the above-described first embodiment, and therefore description thereof will not be included here. Processing procedures of the operator PC 102 and the HTTP relay server 103 are also the same as those of the above-described first embodiment, and therefore description thereof will not be included here.

Figure 7A:
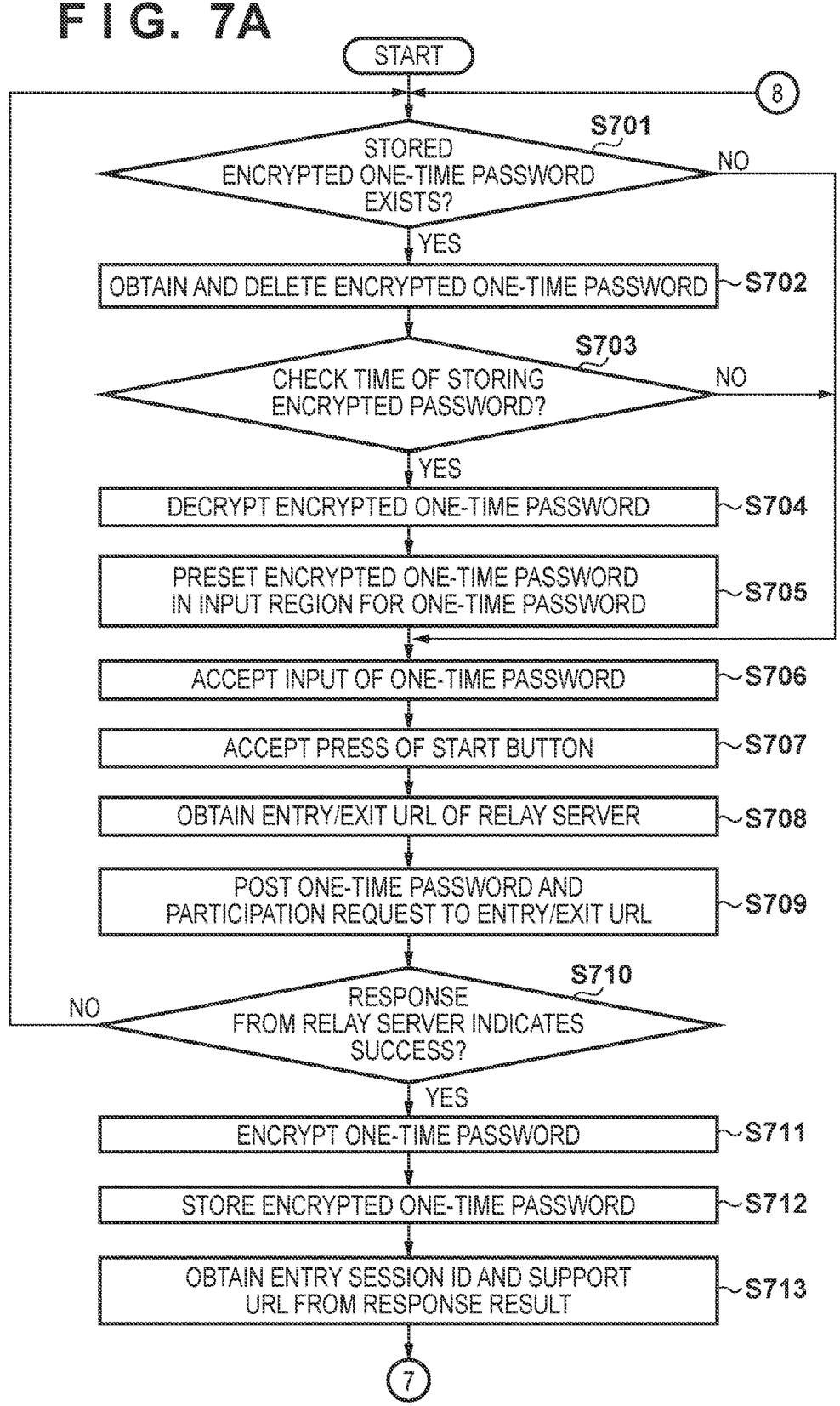

A processing procedure of the image forming apparatus 101 according to the present embodiment will be described with reference to FIGS. 7A and 7B. The processing described below is realized by a program stored in the HDD 205 being read out to the RAM 204 and executed by the CPU 202 for example.

First, in step S701, when a screen for remote maintenance (acceptance screen) is generated, the CPU 202 of the image forming apparatus 101 determines whether or not an encrypted one-time password is stored in the HDD 205. If it is not stored, the processing moves to step S706. On the other hand, if it is stored, the processing moves to step S702, the CPU 202 obtains the encrypted one-time password from the HDD 205 and thereafter deletes the information from the HDD 205. Next, in step S703, the CPU 202 determines whether or not a predetermined time has elapsed since the storage time by comparing the storage time of the encrypted one-time password and the current time. Here, the predetermined time is set in advance in the image forming apparatus 101 in some cases, and is a fixed value in some cases. If the predetermined time has elapsed, the processing moves to step S706. On the other hand, if the predetermined time has not elapsed, in step S704, the CPU 202 decrypts the encrypted one-time password. As a specific example of processing, a key for storing confidential information, which is set in advance in the image forming apparatus 101, is used to execute the decryption processing. Thereafter, in step S705, the CPU 202 pre-sets the decrypted one-time password in a one-time password input region and displays it such that it can be modified, and the processing moves to step S706.

In step S706, the CPU 202 accepts input of the one-time password. Here, if the processing of step S705 has been performed, the one-time password is already in the input state. In this case, the user of the image forming apparatus 101 may re-input the one-time password, or may proceed to the next processing as-is. The processing of steps S707 to S710 after the input of the one-time password is similar to the processing of steps S402 to S405, and therefore description thereof will not be included here.

If success is indicated in step S710, the processing moves to step S711, and the CPU 202 encrypts the one-time password. As a specific example of processing, a confidential information storage key similar to that used in step S704 is used to execute the encryption processing. By matching the keys used in steps S704 and S711, it is possible to perform the decryption processing in step S704. Thereafter, in step S712, the CPU 202 stores the encrypted one-time password in the HDD 205. Next, in step S713, the CPU 202 obtains the entry session ID and the support URL from the response result.

Next, in step S714, the CPU 202 determines whether or not the stop button has been pressed. If it has been pressed, the processing moves to step S715, and the CPU 202 performs POST of the entry session ID and an exit request to the entry/exit URL. Furthermore, in step S716, the CPU 202 deletes the encrypted one-time password stored in step S712. Accordingly, the remote maintenance ends, and the processing returns to step S701.

On the other hand, if it is determined in step S714 that the stop button was not pressed, in step S717, the CPU 202 determines whether or not an instruction to turn off the power has been given. If it has been instructed, the processing moves to step S718, and the CPU 202 performs POST of the entry session ID and an exit request to the entry/exit URL. Accordingly, the remote maintenance ends, and the processing returns to step S701. If the image forming apparatus 101 is restarted, restarting processing is performed after step S718, and thereafter the processing moves to step S701. If the restarting instruction is accepted while the image forming apparatus 101 is executing remote maintenance, the processing for deleting the encrypted one-time password in step S715 is not performed, and therefore the one-time password is pre-set using the processing of steps S701 to S705. Accordingly, even if restarting is performed during execution of the remote maintenance, it is possible for the user to easily re-connect the remote maintenance after the image forming apparatus 101 starts up.

On the other hand, when it is determined that no instruction was given in step S717, the processing moves to step S719, and the CPU 202 determines whether or not a "do not re-connect" button was pressed after restarting. If it was pressed, the processing moves to step S720, the CPU 202 deletes the encrypted one-time password stored in step S712, and the processing returns to step S714. On the other hand, if it was not pressed, the processing moves to step S721, the CPU 202 performs POST and GET for the support data to/from the support URL using the entry session ID as a parameter. The support data is as stated in the description of FIGS. 3A and 3B. In addition, in the present embodiment, support data for giving an instruction to not re-connect during the restarting of the image forming apparatus 101 is also included.

Next, in step S722, the CPU 202 determines whether or not the support data for which the GET request was sent is support data for giving an instruction to not re-connect to the support room (access destination) that is currently connected to during restarting. If it is not, the processing returns to step S714, and if it is, the processing moves to step S723. In step S723, the CPU 202 deletes the encrypted one-time password stored in step S712 and the processing returns to step S714. The processing of step S721 is carried out repeatedly until the result of the determination in step S714 or S717 is YES.

As described above, in the present embodiment, if the power of the image forming apparatus 101 is switched off during remote maintenance, the one-time password is kept in the stored state and the one-time password is input during the next startup. Accordingly, the user of the image forming apparatus 101 can omit input of the one-time password and can easily resume remote maintenance.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-173126 filed on Sep. 5, 2016, which is hereby incorporated by reference herein in its entirety.

What is claimed is:

1. An information processing system that includes an image forming apparatus, an information processing apparatus, and a relay server,
the information processing apparatus comprising:
a memory device that stores a set of first instructions;
a display unit; and
at least one processor that executes the first instructions to:
make a request to the relay server to obtain a first session ID for communicating with the image forming apparatus via the relay server and temporary authentication information, and
display the obtained temporary authentication information on the display unit,
the image forming apparatus comprising:
a memory device that stores a set of second instructions; and
at least one processor that executes the second instructions to:
accept the temporary authentication information via user input, and
make a request to the relay server using the accepted temporary authentication information to obtain access destination information corresponding to the temporary authentication information and a second session ID for communicating with the information processing apparatus via the relay server, and
the relay server comprising:
a memory device that stores a set of third instructions; and
at least one processor that executes the third instructions to:
issue the first session ID and the temporary authentication information in accordance with a request from the information processing apparatus, and issue the access destination information corresponding to the temporary authentication information accepted by the image forming apparatus and the second session ID, in accordance with a request from the image forming apparatus.

2. The information processing system according to claim 1, wherein
the at least one processor of the relay server further executes the third instructions in the memory device of the relay server to:
authenticate the information processing apparatus that has accessed the relay server,
provide a list indicating a plurality of access destinations for performing communication with the image forming apparatus and usage situations of the access destinations to the information processing apparatus if the authentication is successful, and
issue the first session ID and the temporary authentication information for an access destination selected from among the plurality of access destinations by the information processing apparatus.

3. The information processing system according to claim 2, wherein
the relay server further comprises
a storage unit that stores, for each of the plurality of access destinations, a list in which the temporary authentication information, a session ID, and user information indicating a host user using the access destination are registered.

4. The information processing system according to claim 3, wherein
the at least one processor of the relay server further executes the third instructions in the memory device of the relay server to:
when the first session ID and the temporary authentication information are to be issued in accordance with a request from the information processing apparatus, register the first session ID and the temporary authentication information in the corresponding access destination in the list stored in the storage unit and register a user of the information processing apparatus as a host user.

5. The information processing system according to claim 4, wherein
the at least one processor of the relay server further executes the third instructions in the memory device of the relay server to:
when the access destination information and the second session ID are to be issued in accordance with a request from the image forming apparatus, register the second session ID in a corresponding access destination in the list stored in the storage unit.

6. The information processing system according to claim 5, wherein
the at least one processor of the relay server further executes the third instructions in the memory device of the relay server to:
upon receiving a request to end access to the access destination from the image forming apparatus, delete the second session ID registered in the corresponding access destination in the list stored in the storage unit.

7. The information processing system according to claim 5, wherein
the at least one processor of the relay server further executes the third instructions in the memory device of the relay server to:
upon receiving a request to end access to the access destination from the information processing apparatus, delete the first session ID, the temporary authentication information, and the user information registered in the corresponding access destination in the list stored in the storage unit.

8. The information processing system according to claim 7, wherein the at least one processor of the relay server further executes the third instructions in the memory device of the relay server to:

when a request to end access to the access destination is received from the information processing apparatus, further delete the second session ID if the second session ID has been registered in the corresponding access destination in the list stored in the storage unit.

9. The information processing system according to claim 1, wherein the at least one processor of the image forming apparatus further executes the second instructions in the memory device of the image forming apparatus to:

hold the obtained temporary authentication information, and if the temporary authentication information is held, display the temporary authentication information such that the temporary authentication information can be modified on an acceptance screen for accepting the temporary authentication information.

10. The information processing system according to claim 9, wherein the at least one processor of the image forming apparatus further executes the second instructions in the memory device of the image forming apparatus to:

even if the temporary authentication information is held, if a predetermined time has elapsed since the temporary authentication information was held, display the acceptance screen without using the temporary authentication information held.

11. The information processing system according to claim 9, wherein the at least one processor of the image forming apparatus further executes the second instructions in the memory device of the image forming apparatus to:

when power of the image forming apparatus is to be turned off, upon accepting user input or data from the information processing apparatus via the relay server indicating that the currently-connected access destination is not to be re-connected to during restarting, delete the held temporary authentication information.

12. An image forming apparatus configured to perform communication with an information processing apparatus via a relay server, the image forming apparatus comprising:

a memory device that stores a set of instructions; and
at least one processor that executes the instructions to:
accept temporary authentication information issued from the relay server to the information processing apparatus via user input, and
make a request to the relay server using the accepted temporary authentication information to obtain access destination information corresponding to the temporary authentication information and a session ID for communicating with the information processing apparatus via the relay server.

13. A method for controlling an information processing system that includes an image forming apparatus, an information processing apparatus, and a relay server, the method comprising:

in the information processing apparatus, which includes a display unit,
making a request to the relay server to obtain a first session ID and temporary authentication information for communicating with the image forming apparatus via the relay server; and
displaying the obtained temporary authentication information on the display unit;
in the image forming apparatus,
accepting the temporary authentication information via user input; and
making a request to the relay server using the accepted temporary authentication information to obtain access destination information corresponding to the temporary authentication information and a second session ID for communicating with the information processing apparatus via the relay server; and
in the relay server,
issuing the first session ID and the temporary authentication information in accordance with a request from the information processing apparatus, and issuing the access destination information corresponding to the temporary authentication information accepted by the image forming apparatus and the second session ID in accordance with a request from the image forming apparatus.

14. A method for controlling an image forming apparatus configured to perform communication with an information processing apparatus via a relay server, the method comprising:

accepting temporary authentication information issued from the relay server to the information processing apparatus via user input; and
making a request to the relay server using the accepted temporary authentication information to obtain access destination information corresponding to the temporary authentication information and a session ID for communicating with the information processing apparatus via the relay server.

15. A computer-readable storage medium storing a program for causing a computer to execute steps of a method for controlling an image forming apparatus configured to perform communication with an information processing apparatus via a relay server, the method comprising:

accepting temporary authentication information issued from the relay server to the information processing apparatus via user input; and
making a request to the relay server using the accepted temporary authentication information to obtain access destination information corresponding to the temporary authentication information and a session ID for communicating with the information processing apparatus via the relay server.

* * * * *